(12) United States Patent
Nollet

(10) Patent No.: US 8,212,531 B2
(45) Date of Patent: Jul. 3, 2012

(54) METHOD OF CHARGING A BATTERY, AND A CORRESPONDING CHARGER AND BATTERY

(75) Inventor: Michel Nollet, Noisy le Roi (FR)

(73) Assignee: Sagem Defense Securite, Paris (FR)

( * ) Notice: Subject to any disclaimer, the term of this patent is extended or adjusted under 35 U.S.C. 154(b) by 625 days.

(21) Appl. No.: 11/790,431

(22) Filed: Apr. 25, 2007

(65) Prior Publication Data

US 2007/0252557 A1 Nov. 1, 2007

(30) Foreign Application Priority Data

Apr. 26, 2006 (FR) .................................... 06 03710

(51) Int. Cl.
*H02J 7/04* (2006.01)
*H02J 7/16* (2006.01)
(52) U.S. Cl. ...................... 320/152; 320/150; 320/156
(58) Field of Classification Search .................. 320/150, 320/152, 156
See application file for complete search history.

(56) References Cited

U.S. PATENT DOCUMENTS

| | | | | |
|---|---|---|---|---|
| 4,125,802 A | * | 11/1978 | Godard | 320/150 |
| 5,410,238 A | * | 4/1995 | Ishizuka et al. | 320/150 |
| 5,557,192 A | | 9/1996 | Tamai et al. | |
| 5,670,862 A | * | 9/1997 | Lewyn | 320/149 |
| 5,903,136 A | * | 5/1999 | Takahashi et al. | 320/128 |
| 2003/0128011 A1 | * | 7/2003 | Bertness | 320/134 |
| 2004/0160210 A1 | * | 8/2004 | Bohne et al. | 320/111 |

FOREIGN PATENT DOCUMENTS

| | | |
|---|---|---|
| DE | 44 31 620 A1 | 3/1995 |
| EP | 0 795 946 A2 | 9/1997 |
| WO | WO-99/50925 A1 | 10/1999 |

\* cited by examiner

*Primary Examiner* — Samuel Berhanu
(74) *Attorney, Agent, or Firm* — Muncy, Geissler, Olds & Lowe, PLLC

(57) ABSTRACT

The present invention relates to a method of charging a battery having internal resistance, the method including the step of feeding the battery with substantially constant charging current at a charging voltage that is regulated so as to compensate at least in part for the voltage drop generated by the internal resistance of the battery. The invention also provides a charger and a battery for implementing the method.

6 Claims, 2 Drawing Sheets

METHOD OF CHARGING A BATTERY, AND A CORRESPONDING CHARGER AND BATTERY

The present invention relates to a method of charging a battery, and more particularly a lithium-ion (Li-Io) battery suitable for powering an electrical appliance.

The invention also provides a charger and a battery enabling the method to be implemented.

BACKGROUND OF THE INVENTION

The charging of a lithium-ion battery begins with a stage of charging at constant current that is followed by a stage of charging at constant voltage once the sum of the back-electromotive force (back-emf) of the battery plus the voltage drop caused by the internal resistance of the battery is equal to the output voltage from the charger. Since it is presently recommended to charge the battery at a maximum voltage of 4.2 volts per storage cell present in the battery, the output voltage of the charger is set on that value.

In cold weather, the internal resistance of the battery is very high, such that the stage of charging at constant current is short. Unfortunately, since the stage of charging at constant current is the most efficient stage, that means that the time taken to charge the battery is itself lengthened in a manner corresponding to the extent to which said stage is shortened.

OBJECT OF THE INVENTION

It would therefore be advantageous to have means enabling battery charging to be improved, in particular when a battery presents high internal resistance.

SUMMARY OF THE INVENTION

To this end, the invention provides a method of charging a battery having internal resistance, the method comprising the step of feeding the battery with a substantially constant charging current at a charging voltage that is regulated to compensate at least in part for a voltage drop generated by the internal resistance of the battery.

Thus, the voltage delivered to the battery is equal to the maximum acceptable charging voltage as a function of the charging current delivered, plus the voltage drop due to the internal resistance. This makes it possible to lengthen the stage of charging at constant current, and thus to accelerate the charging process.

The invention also provides a charger and a battery for implementing the method.

The charger of the invention comprises a charger circuit presenting voltage regulation and a compensation circuit associated with the charger circuit and arranged to compensate at least in part for the voltage drop generated by the internal resistance of the battery.

The battery of the invention includes a compensation circuit provided with means for connection to a charger and arranged to control the charger in such a manner that the charger delivers a voltage that compensates for a voltage drop caused by the internal resistance of the battery.

Other characteristics and advantages of the invention appear on reading the following description of particular, non-limiting implementations of the invention.

BRIEF DESCRIPTION OF THE DRAWINGS

Reference is made to the accompanying drawings, in which.

DETAILED DESCRIPTION OF THE INVENTION

Figure 1:
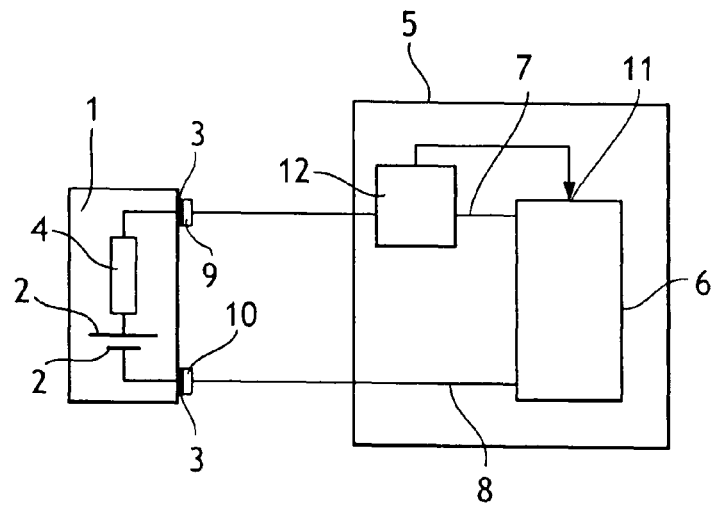
FIG. 1 is a diagrammatic view of a charger in accordance with the invention.
Figure 2:
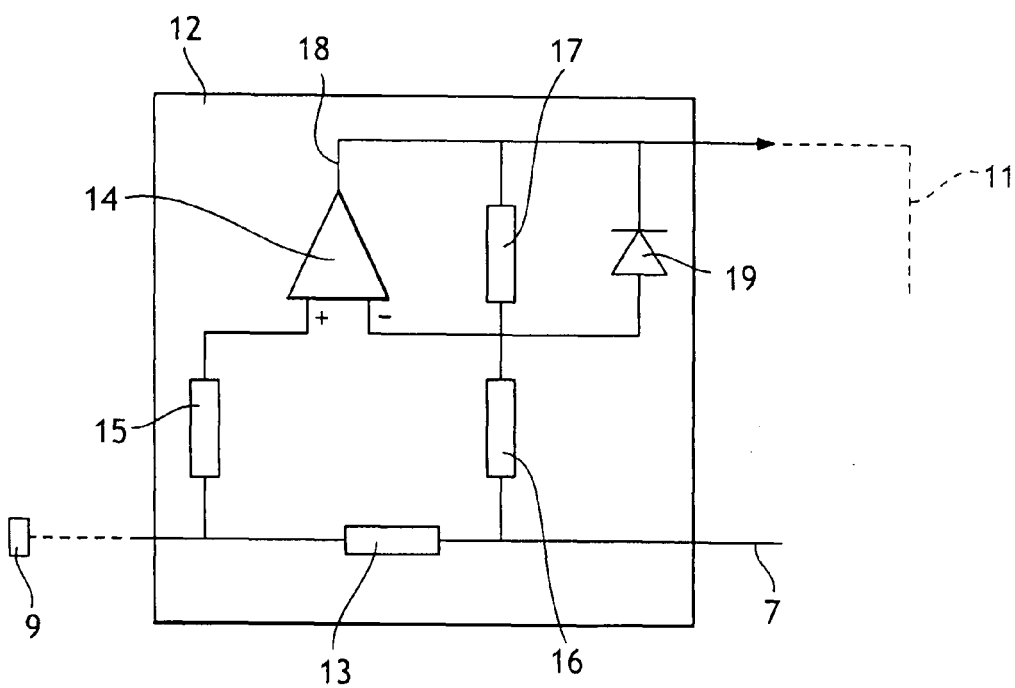
FIG. 2 is a fragmentary diagrammatic view of the charger.

The charger shown in FIGS. 1 and 2 is for charging batteries given overall reference 1 that comprise electricity storage cells each comprising electrodes 2 separated by an electrolyte and connected to external connection terminals 3 of the battery. The storage cells may be connected in series or in parallel to the terminals 3. The battery 1 shown has only one storage cell in order to simplify the explanation of the invention. By construction, the battery 1 presents internal resistance that is symbolized at 4, with the value of the resistance comprising a fixed portion and a portion that varies as a function of temperature (internal resistance being the result in particular of the difficulty charge has in flowing within the electrolyte). The value of the internal resistance increases when temperature lowers.

The charger in accordance with the invention, given overall reference 5, comprises a charger circuit 6 delivering regulated voltage and current, with positive and negative outlets 7 and 8 connected to positive and negative terminals 9 and 10 for connection to the terminals 3 of the battery 1. The charger circuit 6 is itself known and may be thought of as a linear power supply or as a chopper power supply. The charger circuit 6 has a servo-control input 11 for controlling the voltage delivered.

Between the positive output 7 of the charger circuit 6 and the positive connection terminal 9, there is interposed a compensation circuit 12. In this example, the compensation circuit 12 includes a reference resistor 13 connected in series between the positive terminal 7 and the positive connection terminal 9. The compensation circuit 12 further includes an amplifier 14 having its positive input connected via a resistor 15 to the positive connection terminal 9 and to the reference resistor 13, and having its negative input connected via a resistor 16 to the reference resistor 13 and to the positive output 7 of the charger circuit 6. A resistor 17 in series with the resistor 16 and having the same resistance as the resistor 16 is connected to the negative input of the amplifier 14 and to the output 18 thereof to co-operate with the resistor 16 in forming a voltage divider. A diode 19 is connected to the negative input of the amplifier 14 and to its output 18 in parallel with the resistor 17. The output 18 of the amplifier 14 is also connected to the servo-control input 11 of the charger circuit 6.

The resistor 15 presents resistance that is half that of the resistor 16.

The reference resistor 13 presents resistance R equal to the fixed portion of the internal resistance of the battery 1.

In accordance with the invention, the method of charging the battery 1 comprises a step of feeding the battery with substantially constant charging current at a charging voltage U that is regulated so as to compensate at least in part for the voltage drop generated by the internal resistance of the battery 1.

The charging current during the constant current stage is written I and the nominal charging voltage is written u, which will increase regularly as the level of charge rises until it reaches 4.2 volts (V) multiplied by the number of storage cells in the battery 1 (i.e. u=4.2 V since the battery 1 has only one storage cell).

It will be understood that by virtue of the compensation circuit, the charger circuit 6 delivers a voltage U equal to the nominal charging voltage u plus the product of the charging current I multiplied by twice the reference resistance R (i.e. U=u+2RI). Thus, across the terminals of the battery 3, the voltage is equal to the nominal charging voltage u plus the product of the charging current I multiplied by the reference resistance R (i.e. u+RI, since the reference resistor 13 itself leads to a voltage drop of RI). This thus serves to compensate a portion of the voltage drop generated by the internal resistance of the battery 1 during charging.

The diode 19 is a Schottky diode for limiting the compensation to 0.3 volts so as to prevent the charging voltage exceeding 4.5 volts, since that would run the risk of degrading the battery 1. It is necessary to provide one diode 19 per storage cell.

When the back-emf of the battery 1 is equal to the nominal charging voltage u, there follows a stage of charging at substantially constant voltage during which the charging current I tends progressively towards 0 while the charging voltage U tends towards the nominal charging voltage u.

Figure 3:
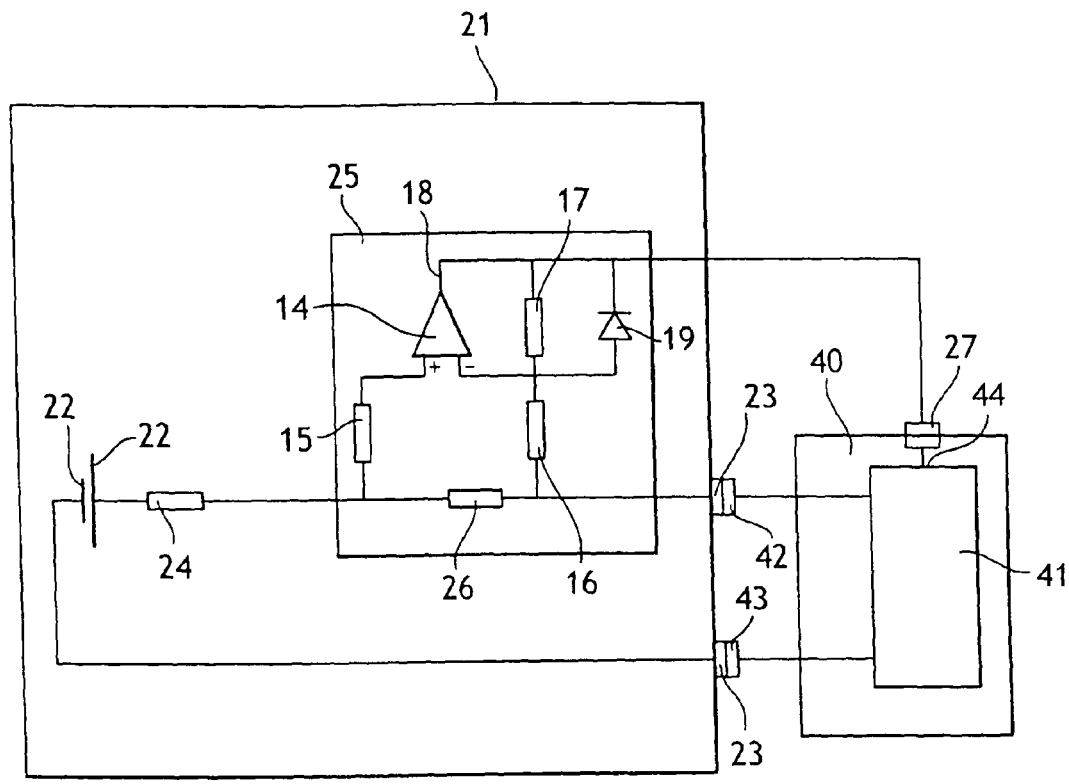
FIG. 3 is a view analogous to that of FIG. 1 showing a battery in accordance with the invention.

FIG. 3 shows another implementation of the method of the invention.

As above, the battery 21 comprises one electricity storage cell having two electrodes 22 separated by an electrolyte and connected to terminals 23 of the battery 21. The battery 21 also has a compensation circuit given overall reference 25 and comprising a reference resistor, resistors 15, 16, 17, an amplifier 14 with an output 18, and a diode 19. The compensation circuit 25 is identical in structure to the compensation circuit 12 of FIG. 2 except in that the reference resistor, now referenced 26, is of structure different from that of the reference resistor 13, as explained below.

The charger used, given reference 40, comprises a charger circuit 41 delivering regulated voltage and current, connected to positive and negative terminals 42, 43 for connection to the terminals 23 of the battery 21. The charger circuit 40 has a servo-control input 44 for controlling its voltage and it is similar to that of the embodiment of FIG. 1.

The reference resistor 26 of the compensation circuit 25 is connected in series between the storage cell and the terminal 3 connected to the positive terminal 42 for connection to the charger 40 (the reference resistor 26 is thus in series with the internal resistance 24). Whereas the reference resistor 13 is of fixed resistance in the first-described embodiment, in this compensation circuit 25, the reference resistor 26 is a resistor having a high temperature coefficient, i.e. a resistor of resistance that varies as a function of temperature. The reference resistor 26 is placed as close as possible to the electrodes 22 and to the electrolyte so as to be subjected to the temperature thereof. It is possible to associate this resistor with an analog amplifier in order to adjust the variation in its resistance as a function of temperature.

The output 18 from the amplifier 14 is connected to a connection connector 27, in turn connected to the servo-control input 44.

The charging method is identical to that described above.

Figure 4:
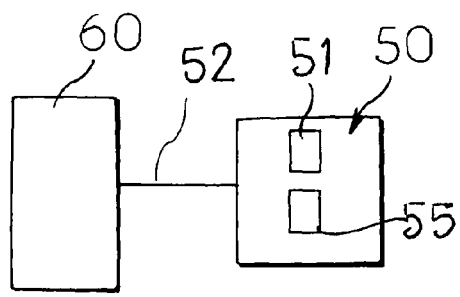
FIG. 4 is a diagrammatic view of a charger in accordance with a variant of the invention.

In FIG. 4 are diagrammatically shown a charger 50, with a charger circuit 51 and a compensation circuit 55, and a battery 60 of the SMART-type which is connected to the charger 50 (the connection is symbolized with the reference number 52) and which is arranged to communicate to the charger 50 information relative to the state of the battery and, among others, a temperature information. The temperature is detected by a temperature sensor such as a thermistor which is disposed in the battery and transmits an electrical signal representative of the temperature to a battery processor. The battery processor extracts the temperature information from the signal and transmits it in digital form to the charger, for example by a connection of the SM Bus type. The signal coming from the thermistor is also transmitted in analogical form directly to the charger by a dedicated connection. The compensation circuit 55 is arranged to use the temperature of the battery to compensate, depending on the temperature, at least in part for the voltage drop resulting from the internal resistance of the battery.

The compensation circuit 55 can be manufactured in a logical or digital embodiment (program executed by a processor of the charger) and/or in an analogical embodiment (for example as the above-described compensation circuit). For the logical or digital embodiment, the SM Bus connection is used and, for the analogical embodiment, the dedicated connection to the thermistor is used. Those embodiments can be combined in the same charger.

Naturally, the invention is not limited to the embodiment described, and variations can be applied thereto without going beyond the ambit of the invention as defined by the claims.

It is possible to replace the fixed-resistance resistor of the compensation circuit of FIGS. 1 and 2 by a component presenting resistance that varies as a function of temperature or as a function of any other parameter presenting variation similar to that of temperature. For example, it is possible to use a junction field effect transistor (JFET) having a voltage applied to its grid that is caused to vary as a function of temperature.

The temperature of the battery can be determined by means of thermostats, thermistors, thermocouples, diode voltages.

During charging, it is also possible for the charger to measure the internal resistance of the battery by applying known variations in current and by observing the corresponding variation in voltage. It is also possible to perform a voltage measurement under open circuit and a voltage measurement under a predetermined current.

Although the compensation circuit in the embodiment described is an analog circuit, the compensation circuit could be implemented in digital form. For a battery of the SMART type integrating a processor, it is possible for the processor to provide a certain amount of information relating to the battery. Provision can thus be made for the processor to deliver a signal representative of the internal temperature of the battery or a signal that is directly representative of the internal resistance of the battery, which signal can be used by the charger in order to determine the charging voltage that needs to be delivered in order to compensate for the internal resistance of the battery.

Advantageously, the compensation circuit is arranged also to compensate for the voltage losses due to the connectors and possibly to internal components of the battery.

What is claimed is:

1. A method of charging a battery having internal resistance using a charger circuit connected to the battery, the method comprising:
   feeding the battery with a substantially constant charging current at a charging voltage that is regulated to compensate at least in part for a voltage drop generated by the internal resistance of the battery during a constant current phase of a charging cycle;
   acquiring a temperature of the battery; and
   regulating the compensation in such a manner that the charging voltage is equal to the sum of a nominal charging voltage of the battery, plus the product of the corresponding charging current multiplied by twice the resistance of a reference resistor connected in series with the charger circuit and the internal resistance of the battery, which varies solely as a function of the temperature of the battery, and presenting resistance that is less than or equal to the internal resistance of the battery.

2. A method according to claim 1, in which the internal resistance presents a value made up of a fixed portion and of a variable portion, the method including the step of compensating the voltage drop that corresponds to the fixed portion of the internal resistance.

3. A charger for a battery having internal resistance, the charger comprising:
    a charger circuit performing voltage regulation; and
    a compensation circuit associated with the charger circuit and arranged to compensate at least in part for the voltage drop generated by the internal resistance of the battery during a constant current phase of a charging cycle;
    the compensation circuit being arranged to compensate solely in relation to the battery temperature and including a reference resistor connected in series with the charger circuit and the internal resistance of the battery, which varies as a function of temperature, and presenting resistance that is less than or equal to the internal resistance of the battery, the compensation circuit being connected to a servo-control input for controlling the voltage of the charger circuit so that the charger circuit delivers a voltage equal to the sum of a nominal charging voltage of the battery plus the product of the corresponding charging current multiplied by twice the resistance of the reference resistor.

4. A charger according to claim 3, wherein the charger is arranged to receive at least temperature information from the battery and the compensation circuit is arranged to compensate at least in part the voltage drop depending on the temperature.

5. A charger according to claim 4, wherein the charger is arranged to receive temperature information from SMART-type batteries.

6. A battery having internal resistance and including a compensation circuit provided with means for connecting it to a charger and arranged to control the charger in such a manner that it delivers a voltage compensating the voltage drop caused by the internal resistance of the battery during a constant current phase of a charging cycle, the compensation circuit including a reference resistor connected in series to the charger circuit and to the internal resistance of the battery, which varies solely as a function of temperature of the battery, and presenting resistance that is less than or equal to the internal resistance of the battery, the compensation circuit being connected to a servo-control input for controlling the voltage of the charger circuit so that the charger circuit delivers a voltage equal to the sum of a nominal charging voltage of the battery plus the product of the corresponding charging current multiplied by twice the resistance of the reference resistor.

* * * * *